United States Patent [19]

de la Salle

[11] Patent Number: 4,917,539
[45] Date of Patent: Apr. 17, 1990

[54] PIPELINE SYSTEMS
[75] Inventor: Brian E. de la Salle, Tring, United Kingdom
[73] Assignee: Saunders & Dolleymore, Watford, England
[21] Appl. No.: 201,692
[22] Filed: Jun. 2, 1988
[30] Foreign Application Priority Data
   Jun. 4, 1987 [GB] United Kingdom ............... 8713069
[51] Int. Cl.⁴ .............................................. F16L 1/00
[52] U.S. Cl. ..................... 405/154; 137/318; 405/303
[58] Field of Search ............... 405/154, 184, 155, 157, 405/303; 285/291; 137/318

[56] References Cited
U.S. PATENT DOCUMENTS

| | | | |
|---|---|---|---|
| 997,464 | 7/1911 | Metcalf | 137/318 |
| 2,608,989 | 9/1952 | McDonald | 137/318 |
| 3,272,211 | 9/1966 | Leopold et al. | 137/318 X |
| 3,703,909 | 11/1972 | Erb | 137/318 |
| 4,067,353 | 1/1978 | DeHoff | 285/197 X |
| 4,411,459 | 10/1983 | Ver Nooy | 285/197 |
| 4,423,311 | 12/1983 | Varney | 285/31 X |
| 4,532,953 | 8/1985 | Rysewyk | 137/318 X |
| 4,649,948 | 3/1987 | Hudson | 137/318 X |

Primary Examiner—Dennis L. Taylor
Attorney, Agent, or Firm—Christie, Parker & Hale

[57] ABSTRACT

A cable entry or exit pipe is formed on a fluid transportation pipeline while in normal operation full of and transporting a fluid under a positive pressure, by a method which comprises the steps: (a) producing two semi-cylindrical shells, one of which carries an oblique branch pipe and has an aperture aligned with the bore of the branch pipe; (b) securing in a fluid tight manner around the pipeline the two shells so as to form a reinforcing collar carrying an oblique branch pipe lying at an acute angle suitable for the entry into and exit from the pipeline of a cable; (c) securing in a fluid tight manner to the free end of the branch pipe an isolating valve; (d) securing in a fluid tight manner to the free side of the isolating valve a fluid tight drilling apparatus equipped with a drilling bit; (e) opening the valve and introducing the drill bit through the opened valve into the branch pipe; (f) rotating and progressively advancing the drill bit into contact with and through the wall of the pipeline section; (g) withdrawing the drill bit and closing the valve; and (h) removing the drilling apparatus. Preferably, a liner inserted into the branch pipe between steps (g) and (h) serves as a cable guide.

9 Claims, 2 Drawing Sheets

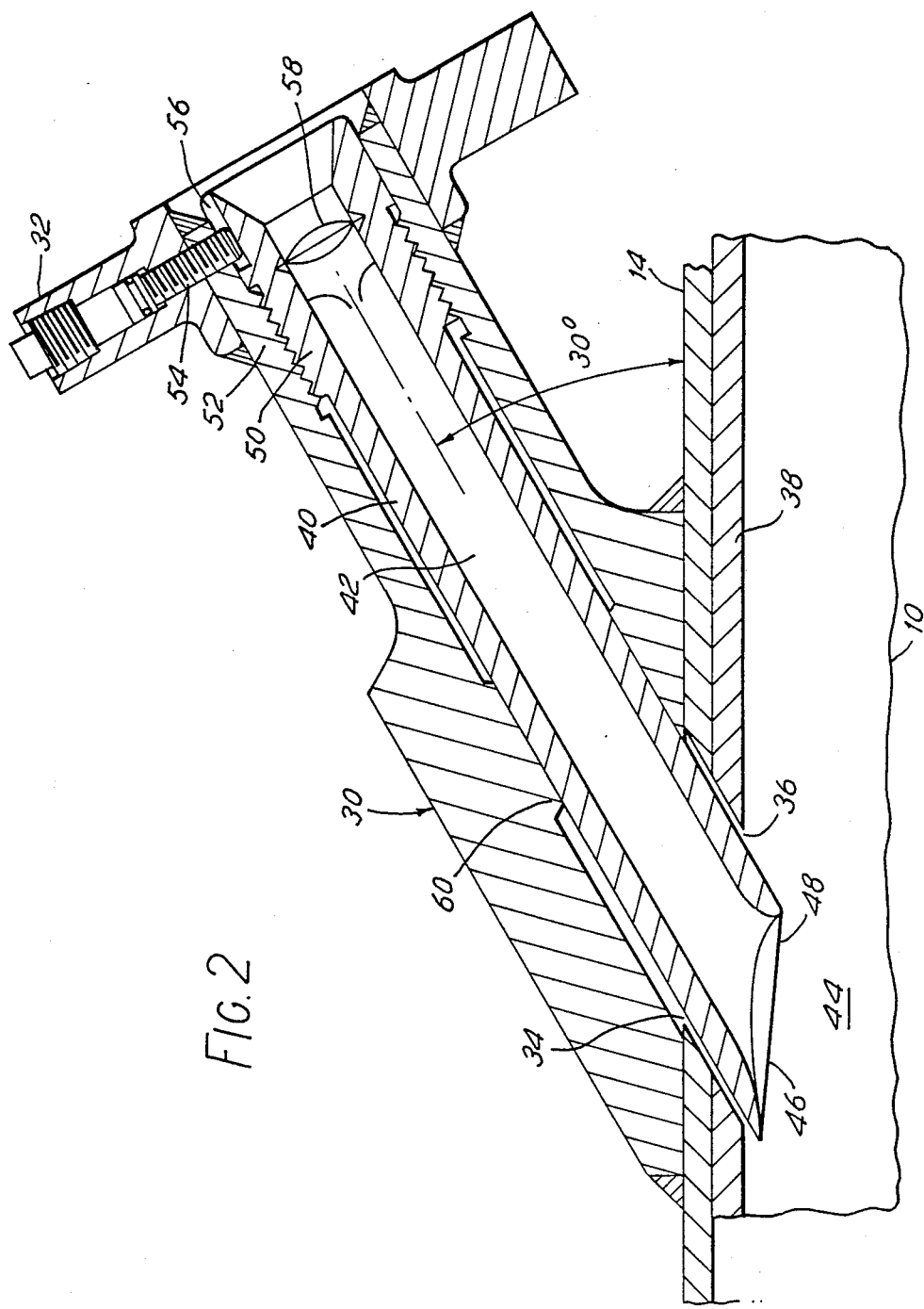

PIPELINE SYSTEMS

This invention relates to fluid transportation pipeline systems for transporting bulk liquids or gases over substantial distances, and to a means for and a method of modifying such a pipeline system whilst it is in normal operation, whereby to effect a permanent change in such a system.

In our concurrently-filed, co-pending patent application titled 'Pipeline Systems' filed in the name of Geoffrey J. Grocott and Ralph E. J. Baskett filed on even date herewith 07/201,691, filed June 2, 1988 there is disclosed the concept of, and a method of, deploying within (instead of alongside) a fluid transportation pipeline for transporting bulk liquids or gases an electrical or other cable or line for transmitting data, control or other signals which need to be transmitted from one location on a pipeline system to another such location.

In the case of a new pipeline, suitable branch pipes for the entry and exit of such a cable or line can be readily provided, by design, from the outset, that is during the construction of the pipes from which the system will eventually be assembled on site.

However, there is also a need to provide such branch pipes permanently on existing pipelines, even whilst they are in normal operation, full of a liquid or gas flowing under a high positive pressure.

According to one aspect of the present invention, a branch pipe for enabling the entry or exit of a cable to or from an existing pipeline is provided at a preferably straight section of the pipeline, the branch pipe being disposed relative to the pipeline section in that case at an acute angle of approximately 30 degrees, and having a bore diameter which is substantially less than that of the pipeline.

Preferably, such a branch pipe is secured to the pipeline section indirectly by means of a cylindrical reinforcing collar or sleeve which is itself secured in a fluid tight manner around the pipeline section. Preferably, such a cylindrical collar comprises two half-shells, to one of which the branch pipe has been secured in a fluid tight manner. In that case, the half-shells are secured in a fluid tight manner around the pipeline section, being joined longitudinally together and circumferentially to the pipeline section, and the bore of the branch pipe opens on to the external surface of the existing pipeline through an aperture formed in the associated half-shell.

In order to connect the bore of the branch pipe with the bore of the pipeline, the present invention preferably provides in the branch pipe guide and support surfaces through which a rotating drill may be introduced for the purpose of drilling an oblique or skewed aperture through the wall of the pipeline section, the guide and support surfaces providing both guidance and sideways support for the drill during the course of drilling the pipeline aperture.

According to another preferred feature of the invention, a tubular cable guide or liner is secured in the branch pipe with one end thereof protruding through the oblique aperture in the pipeline wall, which end is smoothly shaped for the passage therethrough, or disposition therein, of a said cable or line without suffering damage.

Preferably, the cable guide is supported in the branch pipe by at least one of the said guide and support surfaces.

According to a further aspect of the present invention, a preferred method of securing such an angled branch pipe to a pipeline section through which bulk fluid is being transported at a high positive pressure includes the following steps:

(a) securing in a fluid tight manner around a selected pipeline section such a split collar carrying an angled branch pipe;
(b) securing in a fluid tight manner to the free end of the branch pipe an isolating valve (preferably, of the slide valve type);
(c) securing in a fluid tight manner to the free side of the isolating valve a fluid tight drilling apparatus equipped with a drilling bit;
(d) opening the valve and introducing the drill bit through the opened valve into the branch pipe, preferably through guide and support surfaces formed in the branched pipe;
(e) rotating and progressively advancing the drill bit into contact with and through the wall of the pipeline section;
(f) withdrawing the drill bit and closing the valve; and
(g) removing the drilling apparatus.

Preferably, the step (g) is preceded by the following additional steps:

(i) replacing the drill bit by a driving tool carrying temporarily thereon a branch pipe liner;
(ii) opening the isolating valve and advancing the driving tool so as to engage the liner in said guide and support surfaces formed in the branch pipe;
(iii) securing the liner in position in the branch pipe with its shaped nozzle properly oriented for the passage therethrough of a said cable;
(iv) withdrawing the driving tool; and
(v) closing the isolating valve.

Other features of the present invention will become apparent from a reading of the description that follows hereafter, and of the claims appended at the end of that description.

One straight pipeline section having secured thereon a branch pipe, and a method of providing that branch pipe, all according to the present invention, will now be described by way of example and with reference to the accompanying diagrammatic drawings.

In those drawings:

FIG. 2 shows, to a larger scale and in a vertical diametral section, part of the pipeline shown in the FIG. 1, together with the associated branch pipe and a branch pipe liner.

Figure 1:
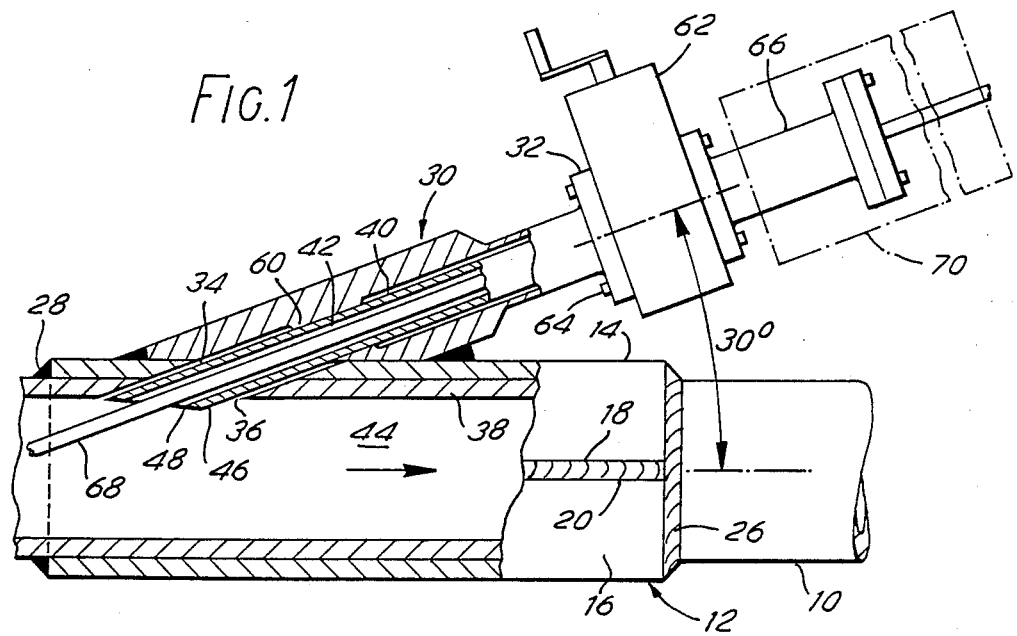
FIG. 1 shows a side view, partly in vertical diametral section, of a part of an existing pipeline which has been newly fitted with a cable exit branch pipe in accordance with the present invention, and indicates other apparatus which is used in the deployment of a cable in that pipeline.
Figure 3:
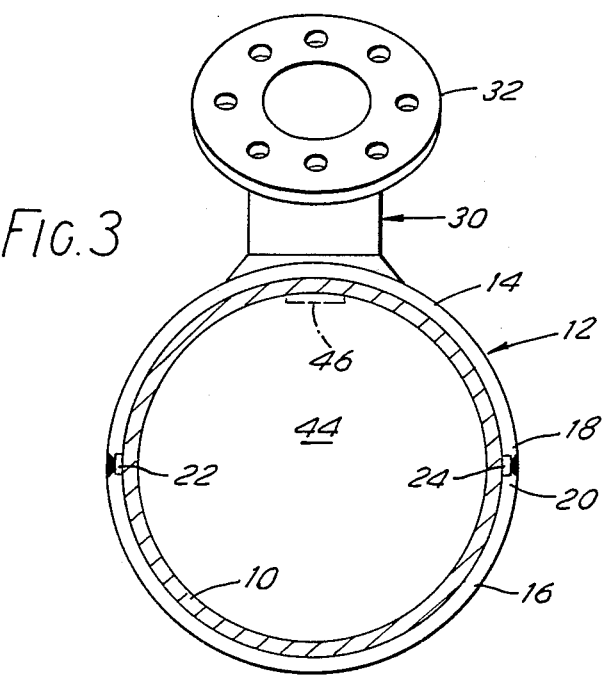
FIG. 3 shows an end view of the pipeline shown in the FIG. 1 and its associated branch pipe.

Referring now to the drawings, a straight section of a steel pipeline 10 carries externally thereon a cylindrical steel collar 121 comprising upper and lower half-shells 14, 16 which have been welded together along opposed longitudinal margins 18, 20 over enclosed backing strips 22, 24, and which have then been welded to the pipeline 10 at their respective circumferential margins 26, 28.

The upper half-shell 14 has welded thereto an oblique branch pipe 30 which is inclined to the pipeline an an angle of approximately thirty degrees.

The branch pipe carries a circular flange 32 at its upper, free end, and communicates at the lower end with an aperture 34 formed in the upper half-shell 14, and with an aligned aperture 36 drilled in the pipeline wall 38.

The branch pipe has secured therein a cable guiding sleeve or liner 40. That liner defines a longitudinal cylindrical bore 42 which communicates at its lower end with the bore 44 of the pipeline 10. The lower end of the liner constitutes an obliquely shaped nozzle 46 which projects only a short way into the pipeline bore 44, and which has smoothly rounded surfaces 48 over, or against, which an electric or other cable may pass, or lie, without suffering damage.

The liner is supported in position in the branch pipe by a screw-threaded upper portion 50 which is engaged in a screwthreaded throat 52 of the branch pipe 30, and is secured against rotation by a locking screw 54 which locates in a longitudinal keyway 56 formed in the upper end of the liner.

The longitudinal bore 42 of the liner opens out at its upper end from a circular into a square cross section, for the purpose of receiving therein a driving tool (not shown) of square transverse cross section. Arcuate gouges 58 are formed in that upper part of the liner bore, for the purpose of receiving temporarily spring-biased location balls (not shown) provided on the said driving tool.

The liner is guided and supported near its lower end by a cylindrical support surface 60 formed within the branch pipe 30.

To the branch pipe flange 32 is secured an isolating valve unit 62 preferably of the slide valve type, by bolts 64, and to the free side of that valve unit is bolted a fluid sealing means 66.

An electrical or other cable 68 is enclosed within the pipeline bore, being there submerged in the fluid being transported in the pipeline (from left to right in the FIG. 1) at a high positive pressure of the order of 1440 pounds per square inch (approximately 99.6 bar) or more, and a flow rate of the order of two meters per second.

The cable exits from the pipeline via the nozzle 46 and longitudinal bore 42 of the liner 40, the isolating valve unit 62, and the fluid sealing means 66. The cable enters the pipeline at an upstream location (not shown) through a similar assembly of branch pipe (secured in like manner to the pipeline), branch pipe liner, isolating valve unit, and fluid sealing means, but in this case the assembly is inclined to the pipeline from the opposite direction, i.e. at an acute angle relative to the part of the pipeline that lies upstream of the branch pipe.

To make possible the deployment of that cable in the existing pipeline 10, and whilst it is in normal operation transporting bulk liquid under a high positive pressure, a branch pipe 12, 30 is first secured externally on the pipeline at each of the selected upstream and downstream locations.

This is achieved by assembling around the pipeline at each such location the two half-shells 14, 16 which constitute a said collar 12 with attached branch pipe 30. After inserting the said backing strips 22, 24 between the pipeline and the respective pairs of opposed longitudinal margins 18, 20 of those half-shells, the longitudinal edges of the half-shells are welded together. Thereafter, the collar so formed has its two ends welded to the pipeline among circumferential paths 26, 28. In each case, the welds so made are fluid-tight welds.

The isolating valve unit 62 is then bolted to the branch pipe flange 32, and to the free side of that valve unit is bolted, in a fluid tight manner, a fluid tight drilling machine 70 having a drill bit in position. That drilling machine is indicated in FIG. 1 by chain-dotted lines.

With the isolating valve in the open condition, the drill bit is advanced into the bore of the branch pipe 30, through the cylindrical support surface 60 and into contact with the outer surface of the pipeline 10.

With the drill bit rotating, it is advanced still further so as to cut an oblique aperture 36 in the pipeline wall.

The drill bit is then retracted into the drilling machine, the valve is shut, and the drill bit is replaced by a said driving tool carrying on its square free end a branch pipe liner 40. The liner is located axially on the driving tool by spring-loaded balls which engage in the arcuate gouges 58 formed in the liner bore.

The isolating valve 62 is opened, and the liner 40 advanced into the branch pipe so as to bring the screw-threaded portion 50 thereof into engagement with the screw-threaded throat 52 of the branch pipe bore, whereupon the liner is rotated to screw it firmly into its working position in the branch pipe, with the nozzle thereof projecting a short way into the pipeline bore 44.

The driving tool is then withdrawn from the end of the liner (against the resistance offered by the spring-loaded balls), and from the isolating valve unit, whereupon the isolating valve is closed, and the drilling machine removed.

The fluid sealing means 66 is then secured to the isolating valve unit in place of the drilling machine, and a cable 68 is deployed in the pipeline in the manner described in the afore-mentioned co-pending patent application, to which the reader's attention is hereby directed for further information concerning the method of deployment of the cable.

The screw-threaded engagement of the liner in its socket 52 enables the subsequent removal of the liner from the branch pipe at any time, in the event, for example, that it is necessary to seal the branch pipe temporarily by means of a screw-threaded sealing plug (inserted in place of the liner) as a preliminary to removing the slide valve for replacement or repair.

In such a case, the cable would be removed from the pipeline first so as to enable the slide valve to be closed temporarily as a preliminary to the withdrawal of the liner.

If desired, the screw-threaded portion 50 of the liner 40 may be shortened, so as to permit the use in association with such a shortened liner of a screwed annular retention plug. Such a modified construction would permit the temporary sealing of the branch pipe without the need to remove the liner itself, since the temporary screwed sealing plug could be inserted in place of the annular retention plug alone.

Alternatively and more advantageously, the liner 40 may be shortened by omitting the screw-threaded portion 50, and be provided instead with a radial flange for effecting axial location of the liner in the branch pipe, and an axial keyway for effecting rotational location in the branch pipe. In that case, the liner would be secured against axial movement by an annular retention plug screwed into the screw-threaded throat 52 of the branch pipe. Such an arrangement has the two advantages: (a) that the liner 40 once inserted need never be removed, and (b) that it ensures correct and easy positioning of the obliquely-shaped nozzle end 46 of the liner relative to the bore 44 of the pipeline into which it protrudes.

For a pipeline having a nominal bore of approximately 8 inches (203 mm) diameter, the branch pipe has had an internal diameter of approximately 2 inches (51 mm).

The branch pipes, and method of securing them to a pipeline, described above make it possible to deploy a cable or other line in an existing pipeline whilst it is in normal operation transporting fluid under a high operating pressure, and with the minimum of difficulty.

Whereas the branch pipe has been described as being inclined at angle of approximately thirty degrees to the pipeline, any other angle of inclination may be selected instead, provided that it will ensure for a cable to be deployed in the pipeline a smooth passage into/out of the pipeline, and at the same time not present any insuperable difficulties in constructing and securing the branch pipe and drilling the aperture in the pipeline wall.

Whereas, it is preferred to provide around the pipeline section 10 the reinforcing collar 12 (14,16) for carrying the branch pipe 30, that collar may be omitted and the branch pipe secured directly to the pipeline section.

If desired, additional guide and support surfaces may be provided for supporting and guiding the drill bit and the liner 40.

I claim:

1. A method of forming a cable entry or exit pipe on a fluid transportation pipeline while in normal operation full of and transporting a fluid under a positive pressure, which method comprises the following steps:
   (a) producing a branch pipe having an end thereof shaped to fit closely around a section of the pipeline when disposed at a predetermined acute angle thereto, the branch pipe having a bore which is substantially less than that of the pipeline;
   (b) securing in a fluid tight manner said end of the branch pipe to the pipeline section thereby to provide an oblique branch pipe lying at an acute angle to the pipeline section, which angle is suitable for the entry into or exit from the pipeline of a cable or other line;
   (c) securing an isolating valve in a fluid tight manner to the free end of the oblique branch pipe;
   (d) securing a fluid tight drilling apparatus in a fluid tight manner to the free side of the isolating valve, which fluid tight drilling apparatus is equipped with a removable drill bit;
   (e) opening the valve and introducing the drill bit through the opened valve into the oblique branch pipe;
   (f) rotating and progressively advancing the drill bit into oblique contact with and through the wall of the pipeline section while simultaneously supporting and guiding the drill bit against transverse displacement thereof by the pipeline wall being drilled obliquely, thereby to form in the pipeline wall an aperture, which aperture has a jagged edge to the bore of the pipeline section;
   (g) withdrawing the drill bit and closing the valve;
   (h) producing a tubular branch pipe liner for lodgment in the oblique branch pipe to serve there as a cable guide tube covering said jagged edge of the aperture, the liner having one end shaped and smoothed so as to minimize damage to a cable being fed into or withdrawn from the pipeline through the liner;
   (i) replacing the drill bit by a driving tool carrying temporarily thereon said branch pipe liner;
   (j) opening the isolating valve and advancing the driving tool and branch pipe liner through the isolating valve into the oblique branch pipe thereby to engage the branch pipe liner in the branch pipe in a predetermined disposition in which said shaped one end just projects into the pipeline section, covers said jagged edge, and is properly oriented for the passage therethrough of a said cable;
   (k) securing the liner in the branch pipe in said disposition;
   (l) withstanding the driving tool through the isolating valve;
   (m) closing the isolating valve; and
   (n) removing the drilling apparatus from the isolating valve.

2. A method according to claim 1, wherein the steps (a) and (b) comprise:
   (i) producing two semi-cylindrical shells, one of which incorporates the said oblique branch pipe disposed at the said acute angle, the two shells being shaped so as to fit closely around the pipeline section; and
   (ii) securing in a fluid tight manner around the pipeline section the two semi-cylindrical shells thereby to form around the pipeline section a reinforcing collar carrying said oblique branch pipe lying at said acute angle to the pipeline section.

3. A method according to claim 1, wherein the steps (a) and (b) comprise:
   (i) producing two semi-cylindrical shells shaped so as to fit closely around the pipeline section, one of the shells having formed therein an aperture;
   (ii) shaping said end of the branch pipe so as to fit closely around said one of the shells instead of directly around the pipeline section;
   (iii) securing in a fluid tight manner said end of the branch pipe to the apertured shell with the bore of the branch pipe in alignment with said aperture; and
   (iv) securing in a fluid tight manner around the pipeline section the two semi-cylindrical shells thereby to form around the pipeline section a reinforcing collar carrying said oblique branch pipe lying at said acute angle to the pipeline section.

4. A method according to claim 1, wherein the branch pipe incorporates internally a raised, annular, guide and support surface for guiding and supporting the drill bit as it is rotated and advanced in step (f), which surface is disposed adjacent the junction of the branch pipe with the pipeline section.

5. A method according to claim 1, wherein said oblique branch pipe has formed therein a female screw threaded portion, and said liner has a male screw threaded portion formed thereon, and during said step (j), said driving tool rotates the liner thereby to engage the cooperating male and female screw treaded portions of the liner and branch pipe respectively and thereby advance and position the liner in the branch pipe.

6. A method according to claim 1, wherein in step (k) the liner is secured in position in the oblique branch pipe by means of a screw threaded member.

7. A method according to claim 1, wherein the branch pipe is disposed at an angle of substantially thirty degrees to the pipeline section.

8. A method according to claim 1, wherein the isolating valve comprises a valve of the slide valve type.

9. A method according to claim 1, wherein the pipeline section has a nominal bore of approximately 203 mm, and the branch pipe has an internal diameter of approximately 51 mm.

* * * * *

UNITED STATES PATENT AND TRADEMARK OFFICE
CERTIFICATE OF CORRECTION

PATENT NO. : 4,917,539

DATED : April 17, 1990

INVENTOR(S) : Brian E. de la Salle

It is certified that error appears in the above-identified patent and that said Letters Patent is hereby corrected as shown below:

On the Front Page:

[73] Assignee, change "Saunders & Dolleymore, Watford, England" to -- British Pipeline Agency Limited, Hemel Hempstead, United Kingdom --.

Column 1, line 13, after "herewith" insert a comma.

Column 2, line 61, change "121" to -- 12 --.
Column 2, line 67, change "an" to -- at --.

Column 3, line 17, change "screwthreaded" to -- screw-threaded --.
Column 3, line 67, change "among" to -- along --.

Column 4, line 35, change "afore-mentioned" to -- aforementioned --.

Column 5, line 13, before "angle" insert -- an --.

UNITED STATES PATENT AND TRADEMARK OFFICE
CERTIFICATE OF CORRECTION

PATENT NO. : 4,917,539

DATED : April 17, 1990

INVENTOR(S) : Brian E. de la Salle

It is certified that error appears in the above-identified patent and that said Letters Patent is hereby corrected as shown below:

Column 5, line 58, change "to" to -- at --.

Column 6, line 10, change "withstanding" to -- withdrawing --.

Column 6, line 54, change "treaded" to -- threaded --.

Signed and Sealed this

Twenty-third Day of July, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,917,539

DATED : April 17, 1990

INVENTOR(S) : Brian E. de la Salle

It is certified that error appears in the above-identified patent and that said Letters Patent is hereby corrected as shown below:

On the Title Page:

[73] Assignee, change "Saunders & Dolleymore, Watford, England" to

--British Pipeline Agency Limited,
Hemel Hempstead, United Kingdom--

Signed and Sealed this

Third Day of November, 1992

*Attest:*

DOUGLAS B. COMER

*Attesting Officer*   Acting Commissioner of Patents and Trademarks